(No Model.)

E. MAY.
MACHINE FOR TURNING PEARL BUTTONS.

No. 312,140. Patented Feb. 10, 1885.

Witnesses

Ernest May, Inventor

UNITED STATES PATENT OFFICE.

ERNEST MAY, OF PARIS, FRANCE, ASSIGNOR TO MAY FRÈRES & CO., OF SAME PLACE.

MACHINE FOR TURNING PEARL BUTTONS.

SPECIFICATION forming part of Letters Patent No. 312,140, dated February 10, 1885.

Application filed November 17, 1884. (No model.) Patented in France October 17, 1884, No. 152,255, and in England October 24, 1884, No. 14,090.

*To all whom it may concern:*

Be it known that I, ERNEST MAY, of Paris, France, manufacturer, have invented an Improved Machine for Turning Pearl-Shell Buttons, with a double-ended sliding carriage for the lathe and the grinding device, of which the following is a specification.

The object of my invention is to provide a machine for turning mother-of-pearl buttons, having a double-ended sliding carriage for the lathe and the grinding device. This machine is to be substituted for the hand-work by means of a graver, which was very long and expensive, and it provides for a mechanical working by means of a regularly-shaped tool prepared for use by means of a small grinding-pulley and sharpened without being removed from the carriage.

By my improved machine the production of buttons is greatly facilitated, and by it a very great variety of styles or shapes may be produced; but all the buttons of a particular size and style will be uniform, much more so than can be done by hand.

In order that my invention may be fully understood, I shall now proceed to describe the same with reference to the accompanying drawings.

Figure 1:
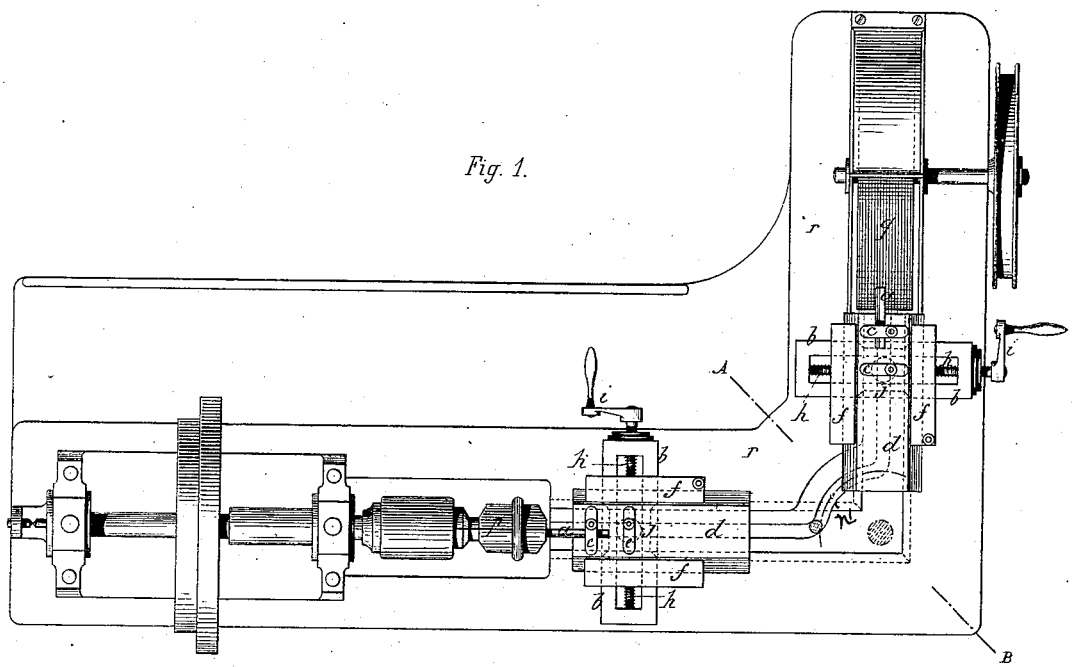
Figure 3:
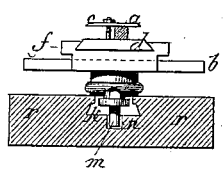
Figure 4:
Figure 2:
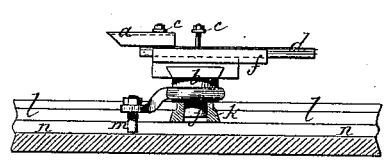
Figure 5:
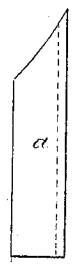
Figure 7:
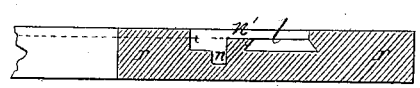
Figure 6:
Figure 8:
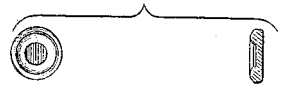

Figure 1 is a plan view of my improved machine for turning mother-of-pearl buttons. It shows the sliding carriage supporting the tool while the same is performing its double office—i. e., conveying the tool on one side to the mandrel carrying the "blank" to be operated, and on the other side moving it toward the grindstone where it is to be sharpened. Figs. 2 and 3 are respectively a side elevation and an end view of the carriage and the slides of the table. Figs. 4, 5, and 6 are respectively a front view, a section, and a plan of the working-tool. Fig. 7 is a cross-section of the table on line A B, Fig. 1; and Fig. 8 is a sectional front view of one of the many forms of buttons that may be turned by means of my improved machine.

Tool *a* is placed upon carriage *b*, and secured upon its upper plate, *d*, by means of clasps *c c*. This plate *d* moves lengthwise in a slide, *f*, which in its turn is moved transversely upon carriage *b* by means of a worm or endless screw, *i*, operated by a handle. Carriage *b* is provided at its lower part with a journal, *j*, turning, as desired, in a bearing, *k*, which with its dovetail end slides in a guide, *l*, of table *r*. Upon the same carriage is provided a pin, *m*, traveling in the longitudinal recess *n* in the bottom of guide *l*. This pin with journal *j* serves to control the travel of carriage *b* upon segment *p'*, as will be presently explained. The carriage is moved by hand, and brings the tool to mandrel *p*, carrying the button to be worked and rotating with a great velocity. The tool presents in section, as aforesaid, the shape of the button to be made, which shape is imparted to it by the small grinding-wheel *o*. (Shown in Fig. 4 as arranged in front of tool *a*.) It is also sharpened by means of a grindstone, and in order that the sharpening may also be effected at the same angle and very rapidly the tool as soon as it becomes blunt is conveyed to the grindstone by carriage *b*. To this end said carriage *b* is drawn back with the tool upon it away from mandrel *p*. Thus, being constantly guided by journal *j* and pin *m*, it is moved to the forward end of slide *l*, where it is caused to describe a quadrant upon journal *j*, being guided by the curved groove *n'*. It then assumes a rectilinear direction again, so as to move crank *i* on the outside of the table. Now the carriage has got only to be pushed straight to grindstone *q*, where the tool is sharpened at a uniform angle. An inverted motion takes place when it is desired to bring the tool into position again, so that it may engage with and act upon the button in operation.

Having thus fully described all parts of my invention, and the manner in which it may be carried into effect, what I claim is—

The combination of the bed of the machine, the revolving mandrel *p*, supported thereon, the bed constructed with a guideway parallel with the axis of said mandrel, said guideway turning from said parallel direction into a direction at right angles thereto, the carriage *b*, arranged upon the bed, the bearing $k$, arranged in said guideway, a journal, $j$, extending from said carriage into said bearing $k$, the tool $a$, adjustably arranged upon said carriage, the grinding-wheel $q$, arranged on said bed in the plane of the right-angular guideway, its axis being parallel with the axis of the mandrel, the groove or recess $n$, parallel with each of the guideways, the one groove communicating with the other by a segment-shaped groove at the angle, a stud, $m$, on the carriage arranged to travel in said grooves, all substantially as and for the purpose described.

In testimony whereof I have signed my name to this specification before two subscribing witnesses.

ERNEST MAY.

Witnesses:
DAVID T. S. FULLER,
ALBERT COHEN.